Jan. 7, 1947.    H. B. DUNCAN    2,414,029
EXTRUSION APPARATUS AND PROCESS
Filed Aug. 2, 1943    2 Sheets-Sheet 1
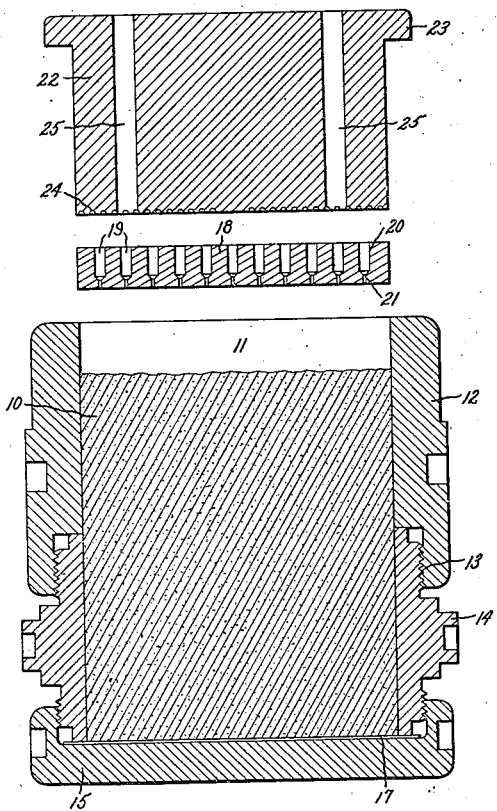
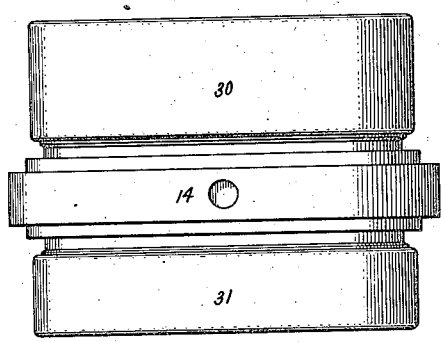
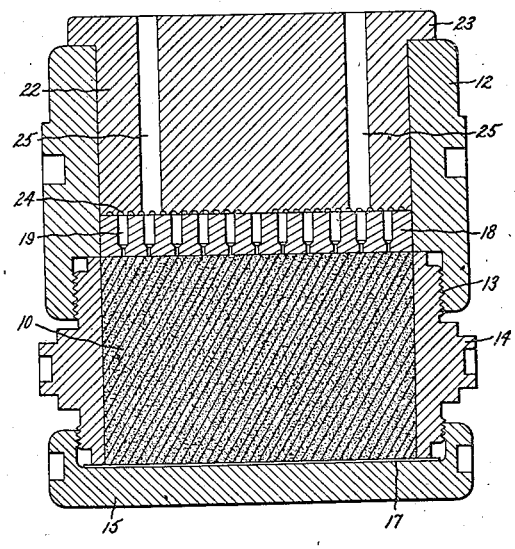
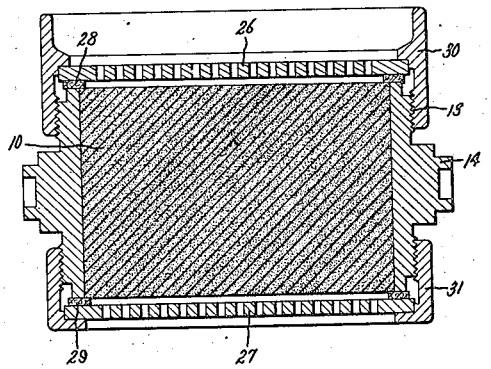
Inventor:
Hershel B. Duncan,
by Harry E. Dunbary
His Attorney.

Jan. 7, 1947.　　　H. B. DUNCAN　　　2,414,029
EXTRUSION APPARATUS AND PROCESS
Filed Aug. 2, 1943　　　2 Sheets-Sheet 2

Inventor:
Hershel B. Duncan,
by Harry E. Dunham
His Attorney.

Patented Jan. 7, 1947

2,414,029

UNITED STATES PATENT OFFICE 2,414,029

EXTRUSION APPARATUS AND PROCESS

Hershel B. Duncan, Detroit, Mich., assignor to Carboloy Company, Inc., Detroit, Mich., a corporation of New York Application August 2, 1943, Serial No. 497,029

9 Claims. (Cl. 18—12)

The present invention is a process and apparatus for preparing powdered materials such as powdered cemented carbide ingredients for extrusion and an apparatus for extruding such material. A cemented carbide consists of a mixture of one or more hard metal carbides and a cementing metal therefor the mixture having been sintered at a relatively high temperature. Taylor Patent 2,271,960, February 3, 1942, discloses a process for extruding such material. In the Taylor process it has been customary to place a series of compressed disks in a long, narrow, perforated holder. Thereafter the disks in the holder are plasticized and then extruded. The quantity of powdered material which can be placed in such perforated holders is relatively small and the holder requires frequent refilling and cleaning.

It is one of the objects of the present invention to provide a cylindrical or ring shaped holder which may be filled with a relatively large quantity of compressed powdered material suitable for extrusion. It is a further object of the invention to provide means whereby a plurality of such loaded rings may be secured in series with one another and an extrusion die whereby a large quantity of plasticized powdered material may be extruded in a continuous operation. Another object of the invention is to provide a relatively large, pressed powdered mass having a uniform structure which permits even penetration of a solution employed in plasticizing the mass. It is a further object to provide a simplified apparatus for extruding powdered plastic material. Other objects will appear hereinafter.

Figure 6:
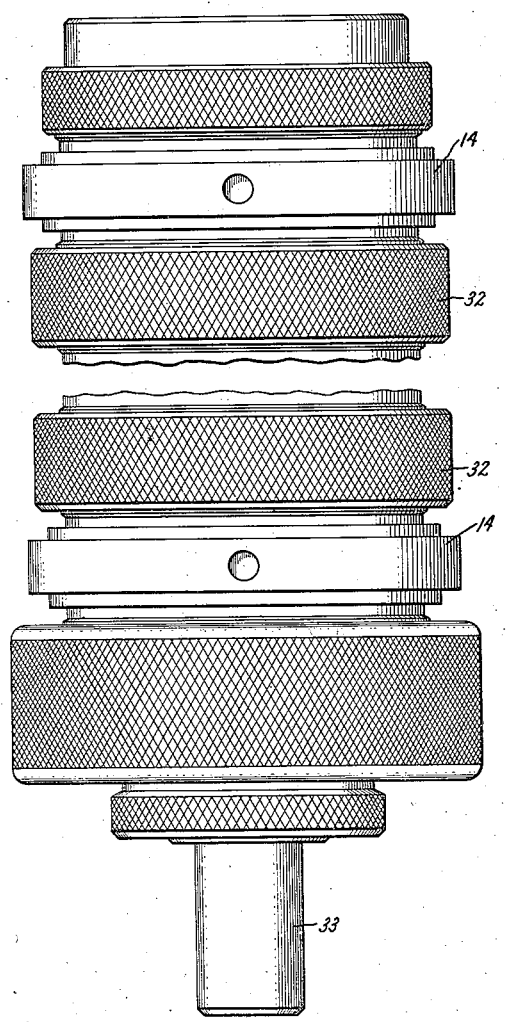
Figure 5:
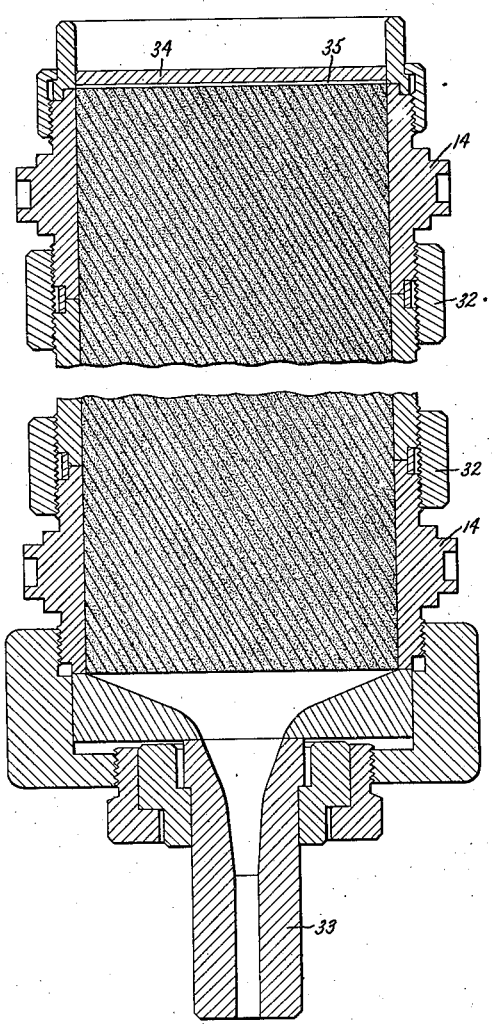

The novel features which are characteristic of my invention are set forth with particularity in the appended claims. The invention itself however will best be understood from reference to the following specification when considered in connection with the accompanying drawings in which Fig. 1 is a vertical cross section of an apparatus which may be employed in carrying my invention into effect; Fig. 2 is a vertical cross section of the apparatus shown in Fig. 1 after the powdered material has been compacted therein; Fig. 3 is a vertical sectional view of the compacted material within the ring holder after the compacted material has been saturated with a water glycerine solution; Fig. 4 is a view in elevation of the apparatus illustrated in Fig. 3; Fig. 5 is a vertical cross sectional view of a plurality of rings filled with compacted material and superimposed one on the other and connected to an extrusion die; while Fig. 6 is a view in elevation of the apparatus illustrated in Fig. 5.

In carrying out the present invention the mixed powdered material 10 to be extruded is placed in a container 11 which comprises a hollow, relatively heavy metal cylinder 12 having a uniform internal diameter and provided with a recessed screw threaded portion 13 at its lower end to which a screw threaded ring 14, having the same internal diameter as cylinder 12, may be secured. The lower end of the hollow cylinder or ring 14 is screw threaded and engages a screw threaded cap or closure member 15. A layer of thin paper or other suitable material 17 covers the inner flat surface of the cap 15 to separate the steel cap and powder. The material in container 11 may consist of a powdered mixture of cemented carbide ingredients and dry starch, for example tungsten carbide, cobalt and starch. The quantity of powdered material placed in the container is such that when compressed to the desired extent it will exactly fill the ring 14.

After the mixed powdered materials have been placed in container 11 they may be consolidated to a limited extent by means of vibrations imparted thereto. A perforated metal disk 18 having a diameter substantially equal to the inner diameter of the container 11 and provided with openings 19 extending therethrough is placed on top of the mixed powdered material. The openings or holes 19 which extend through the disk 18 comprises an upper enlarged portion 20 and a constricted lower portion 21. The openings 19 permit easy removal of occluded gases from the mixed powdered material as it is compacted in the container 11 and ring 14. A relatively heavy metal plug or plunger 22, provided with a shoulder 23 at its upper end, is positioned on top of the disk 18. The plug 22 is provided on its lower surface with a spiral groove 24 which communicates with a plurality of openings 25 which extend longitudinally through the plug. The plug 22 and perforateld disk 18 tend to provide a pressed powder compact or ingot which has a uniform structure and substantially the same density throughout its mass.

The powdered ingredients in container 11 usually are consolidated by vibration until the lower surface of the shoulder 23 on the plug 22 is spaced about one-half inch from the upper end of the container 11. The container 11 is then placed in a hydraulic press and pressure applied to the plug 22 and the powdered material 10 to compact it to the desired extent. Pressure is applied to the powdered material until the shoulder 23 comes substantially in contact with the upper end of the container 11 at which time the powdered material within the ring will be compressed so as to fill the ring 14 completely as indicated in Fig. 2 of the drawings. Ring 14 with the pressed powdered material therein may now be removed from the press and if desired stored for future use.

If the powdered material is intended for immediate rather than future use it is thoroughly impregnated at this time with a water glycerine solution. In carrying out the impregnation process the ring 14 is provided at opposite ends thereof with perforated plates 26 and 27 which bear against felt gaskets 28 and 29 respectively and are held in place by screw threaded rings 30 and 31. The water glycerine solution is then applied to the compressed powdered material in the ring in any well known manner, for example substantially as set forth in the above-noted Taylor patent. The uniform structure of the pressed powder permits even penetration by the solution. Thereafter the impregnated powder is heated to cook the starch in the pressed powder and then extruded in a well known manner. The water glycerine solution and cooked starch form a plasticizing medium for the cemented carbide ingredients which renders them capable of extrusion.

If desired a plurality of rings 14 containing pressed powdered material therein may be assembled in series and held together by screw threaded rings 32 engaging the upper screw thread on one ring and the lower screw thread on an adjacent superimposed ring as clearly indicated in Figs. 5 and 6 of the drawings. An extrusion die 33 may be secured to one end of the combined rings while pressure may be applied to the opposite end of the combined rings through a plate 34 to force the plasticized powdered material through the extrusion die. A layer of thin paper 35 may be employed to separate the pressed powder from the plate 34. Satisfactory results may be obtained employing rings about 2½ inches in diameter and approximately 1⅝ inches long. By connecting a plurality of such rings in series with one another and with the extrusion die, it is possible to continuously extrude a large quantity of plastic material in a single operation.

What I claim as new and desire to secure by Letters Patent of the United States, is:

1. The process for extruding powdered metallic material which comprises compressing said material entirely within a hollow container until said container is wholly filled, impregnating the compressed material while in said container with a liquid to plasticize it, and thereafter applying pressure to said material in said container to extrude it through a die.

2. The process for preparing powdered material for extrusion which comprises applying pressure in a longitudinal direction to loose, powdered, metallic material while permitting air to escape therefrom and until said compressed powdered material wholly fills a hollow member having a width substantially greater than its length and thereafter impregnating the compressed powdered material while in said container with a liquid to plasticize it and render it suitable for extrusion therefrom.

3. The process of preparing loose, powdered material for extrusion which comprises applying pressure to said loose powdered material to form it into a dense, compact mass within a hollow cylindrical member until said member is wholly filled and thereafter adding a liquid to said material in said member to plasticize it.

4. The process for extruding powdered, metallic material which comprises compressing said material into a dense, compact mass having a diameter substantially greater than its length and wholly filling a ring-shaped container member, impregnating the compressed material in said container with a liquid to plasticize it, and thereafter applying pressure to said plasticized material to extrude it from said member and through a die.

5. The process for preparing loose, powdered material for extrusion which comprises compressing the powdered material by longitudinal pressure into a compact mass having a width substantially greater than its length and wholly filling a hollow cylindrical member, plasticizing said material within said member, connecting a plurality of said members in series with one another and with an extrusion die, and applying pressure at one end of said connected members to extrude the material therein.

6. An apparatus for preparing powdered material for extrusion which comprises a container having two aligned, hollow, cylindrical members, said members having equal inside diameters and equal outside diameters, the inside diameter of each of said members being substantially greater than the length of that member, a perforated plate positioned within said container and a ventilated plunger for applying pressure to said plate and to powdered material within said container, said plunger having means cooperating with said perforations to permit escape of gases from said powdered material, means for limiting the application of pressure to the material within said ring, said means comprising a flange on said plunger, the combined length of the portion of said plunger below said flange and the thickness of said perforated plate being equal to the length of one of said cylindrical members.

7. An apparatus for extruding powdered material, said apparatus comprising a plurality of hollow, cylindrical members each having an inside diameter substantially greater than its length and adapted to be filled separately and under pressure with powdered material to be extruded and thereafter connected together, adjustable means mounted on the outer surfaces of said members for connecting them in series with one another, adjustable means connecting the lower cylindrical member with an extrusion die, and means for applying pressure to the material in said members to extrude it through said die.

8. The method for extruding mixed, powdered, cemented carbide ingredients which comprises applying pressure in a longitudinal direction to the loose powder and permitting escape of air therefrom while compressing the powder into a dense, compact mass having a diameter substantially greater than its length and wholly filling a ring-shaped container, plasticizing the compressed material in said container by impregnating it with a liquid under pressure and thereafter applying pressure to said plasticized material to extrude it from said container.

9. An apparatus for extruding mixed powdered cemented carbide ingredients, said apparatus comprising a plurality of hollow container members, each of said members being approximately one and one-half inches long and about two and one-half inches wide within which the powdered material to be extruded may be compacted until wholly filled and then impregnated with a liquid plasticizing medium, means detachably connecting said filled members in series with each other, an extrusion die connected at one end of said series connected members and means at the other end of said series connected members whereby pressure may be applied to the material therein to extrude it through said die.

HERSHEL B. DUNCAN.